United States Patent [19] [11] 4,075,949
Davis et al. [45] Feb. 28, 1978

[54] CART PUSHING APPARATUS

[75] Inventors: Noel Davis, Wayzata; John T. Haub, Maple Grove; Stanley C. Rustad, Golden Valley, all of Minn.

[73] Assignee: General Mills, Inc., Minneapolis, Minn.

[21] Appl. No.: 659,310

[22] Filed: Feb. 19, 1976

[51] Int. Cl.² ............................................. F27B 9/22
[52] U.S. Cl. ................................ 104/162; 198/743; 198/744
[58] Field of Search ............... 104/162, 163, 172 B, 104/172 BT; 198/736, 739, 743, 744

[56] References Cited

U.S. PATENT DOCUMENTS

| 461,067 | 10/1891 | Ainslie | 198/743 |
|---|---|---|---|
| 1,997,044 | 4/1935 | Cutler | 198/743 |
| 2,583,968 | 1/1952 | Rosseau | 104/162 |
| 3,465,690 | 9/1969 | Landry et al. | 104/162 |
| 3,759,189 | 9/1973 | Desilets | 104/172 S |
| 3,874,302 | 4/1975 | Crosswhite | 104/172 B |
| 3,970,008 | 7/1976 | Borsuk et al. | 104/162 |
| 3,986,458 | 10/1976 | Kling | 104/172 S |

FOREIGN PATENT DOCUMENTS

| 1,142,447 | 11/1967 | United Kingdom | 104/162 |

Primary Examiner—Evon C. Blunk
Assistant Examiner—Carl Rowold
Attorney, Agent, or Firm—G. O. Enockson; L. MeRoy Lillehaugen

[57] ABSTRACT

An apparatus for intermittently pushing a plurality of aligned carts along a predetermined path. The apparatus includes a pair of oscillating pusher bars having a plurality of aligned lugs thereon, which engage a portion of the undersurface of the carts and push them forward as the bars move in a forward direction. As the pusher bars move in the opposite direction, the lugs disengage from the cart, so as to permit the cart to remain stationary.

8 Claims, 6 Drawing Figures

FIG. 2

CART PUSHING APPARATUS

The present invention relates to an apparatus for moving a plurality of cart-mounted trays along a predetermined path, and more specifically to an apparatus for transporting plants positioned in trays, mounted on movable carts which are aligned in a prescribed manner, through an environmental growth chamber.

New procedures and apparatus are constantly being devised for producing plants and edible foodstuffs in a more economical, efficient and productive manner. Efforts are being made to exercise some control over the growing cycle of plants, so that a more uniform and better product is obtained, preferably in a shorter period of time, and with reduced labor and other costs.

Various types of equipment and procedures are known for growing different kinds of plants such as vegetables, flowers, and the like. Customarily, growth chambers include structures such as greenhouses, hot houses, hot beds, climatic chambers and artificially illuminated chambers. Generally, such structures are provided with means for creating an artificial environment therein, and in some instances, they are compartmented in such a way as to provide alternate periods of lightness and darkness. In the latter event, it is desirable to provide some means for moving the plants within the structure between the compartments.

Accordingly, one object of the present invention is to provide an improved apparatus for moving a plurality of aligned carts within a structure, along a predetermined path.

Another object is to provide an apparatus for moving plants positioned in cart-mounted trays, along a predetermined path within a growth chamber.

A further object is to provide a plant transporting apparatus for pushing a plurality of plant-holding trays which are aligned in a prescribed manner, within a growth chamber at a prescribed speed, between alternate periods of lightness and darkness.

A still further object is to provide a cart pusher apparatus for pushing a plurality of aligned movable carts by engaging at least one of the carts and pushing it in a predetermined direction at a prescribed speed.

Other objects and advantages will become apparent from a consideration of the following specification and accompanying drawings, wherein:

FIG. 1 is a partial side elevational view which illustrates the invention within a growth chamber;

Figure 2:
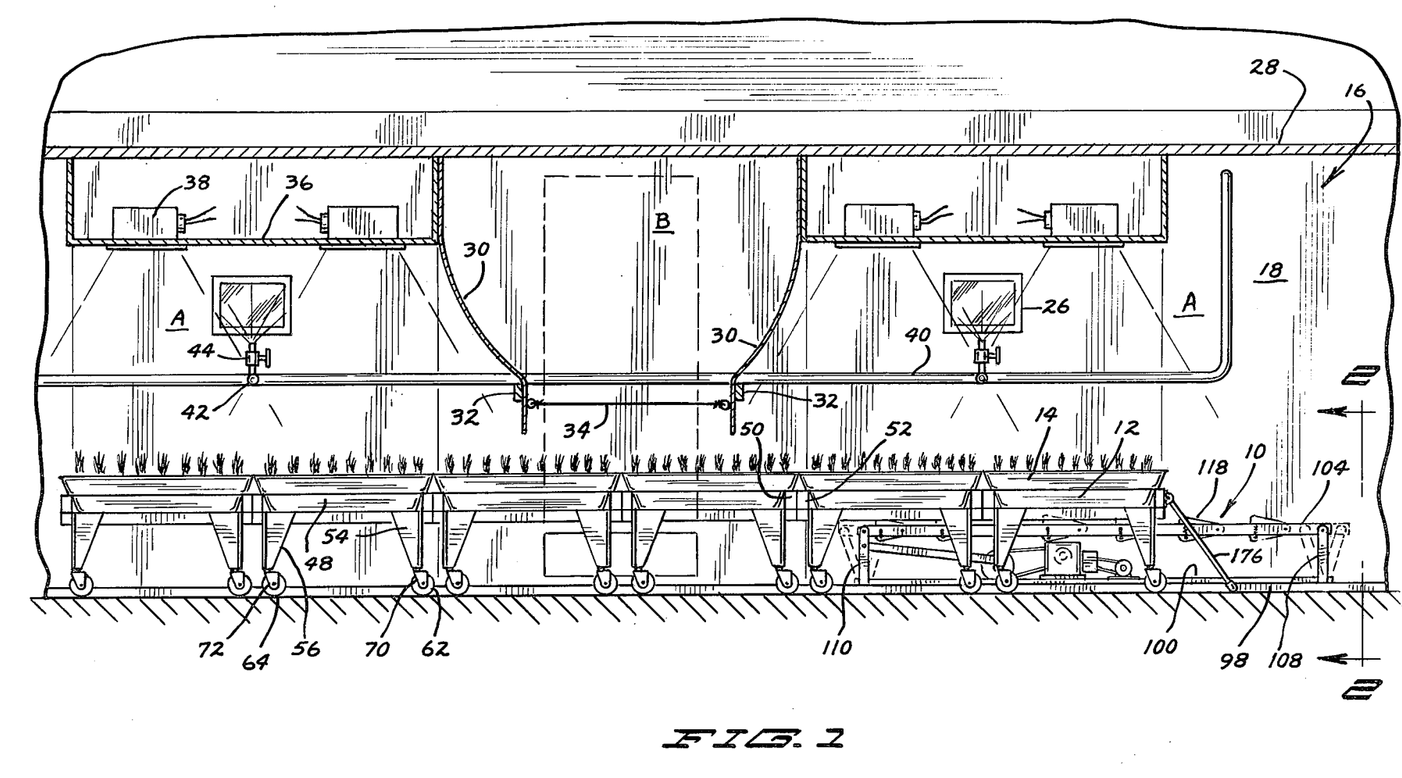
FIG. 2 is an enlarged end view taken along line 2—2 of FIG. 1.

FIG. 1 illustrates a cart pusher apparatus designated generally by numeral 10, a plurality of carts 12, and a plurality of trays 14 positioned within an elongated growth chamber 16. While the pusher apparatus 10 might be used in a variety of installations, for illustrative purposes, it will be described in conjunction with an environmental growth chamber which has been compartmented so as to provide alternate periods of lightness and darkness. As shown in FIG. 2, the elongated chamber 16 is constructed as having a pair of spaced-apart side walls 18 and 20, and a pair of end walls (not shown). Preferably, the walls are constructed of sheets of thin plastic film 22 and 24, formed of polyethylene or the like; such sheets being separated by a layer of air for insulation purposes. A plurality of windows 26 are mounted within the walls, for viewing into the chamber. A ceiling 28 forms the top surface of the chamber.

A number of flaps 30, formed of a heavy fabric material, are secured to the ceiling 28 by appropriate means, not shown. The flaps drape downwardly, and they divide the chamber into a plurality of compartments A and B. A pair of slats 32 are secured to the flaps 30 proximate their bottom edges, and a pair of the flaps are linked together by appropriate means, such as a cable 34. By adjusting the length of the cable 34, the relative spacing between the flaps can readily be adjusted. The compartments B provide the nighttime environment for the plants. The compartments A on the other hand, provide the daytime environment for the plants. A suspended ceiling 36 provides a housing for mounting light fixtures or lamps 38 within the compartments A, such lamps being connected to an appropriate electrical source. The length of the chamber can be designed and constructed to accommodate the specific plants being grown therein.

A sprinkler system is provided for introducing a fluid spray into each of the compartments A. The sprinkler system includes a manifold section 40, which extends along the longitudinal axis of the chamber, and arms or branches 42 which extend laterally into each compartment A. The section 40 is connected to a pressurized fluid medium source, not shown. One or more nozzles 44 are mounted in the branches 42 for introducing the spray into the compartments.

The carts 12 are formed from a frame construction which includes a pair of parallel U-shaped channel members 46 and 48, a pair of parallel support members 50 and 52, and four legs 54, 56, 58 and 60. The legs 54 and 56 are secured at their upper ends to the channel member 46, while the legs 58 and 60 are secured to the channel member 48. Wheels 62, 64, 66 and 68 are secured to the bottom end of the legs 54–60 respectively, by rotatably mounting them in U-shaped brackets 70, 72, 74 and 76. The brackets 70–76 are in turn, connected to the legs for pivotal movement about a vertical axis. Thus, the carts 12 can be freely moved about a work area.

Figure 5:
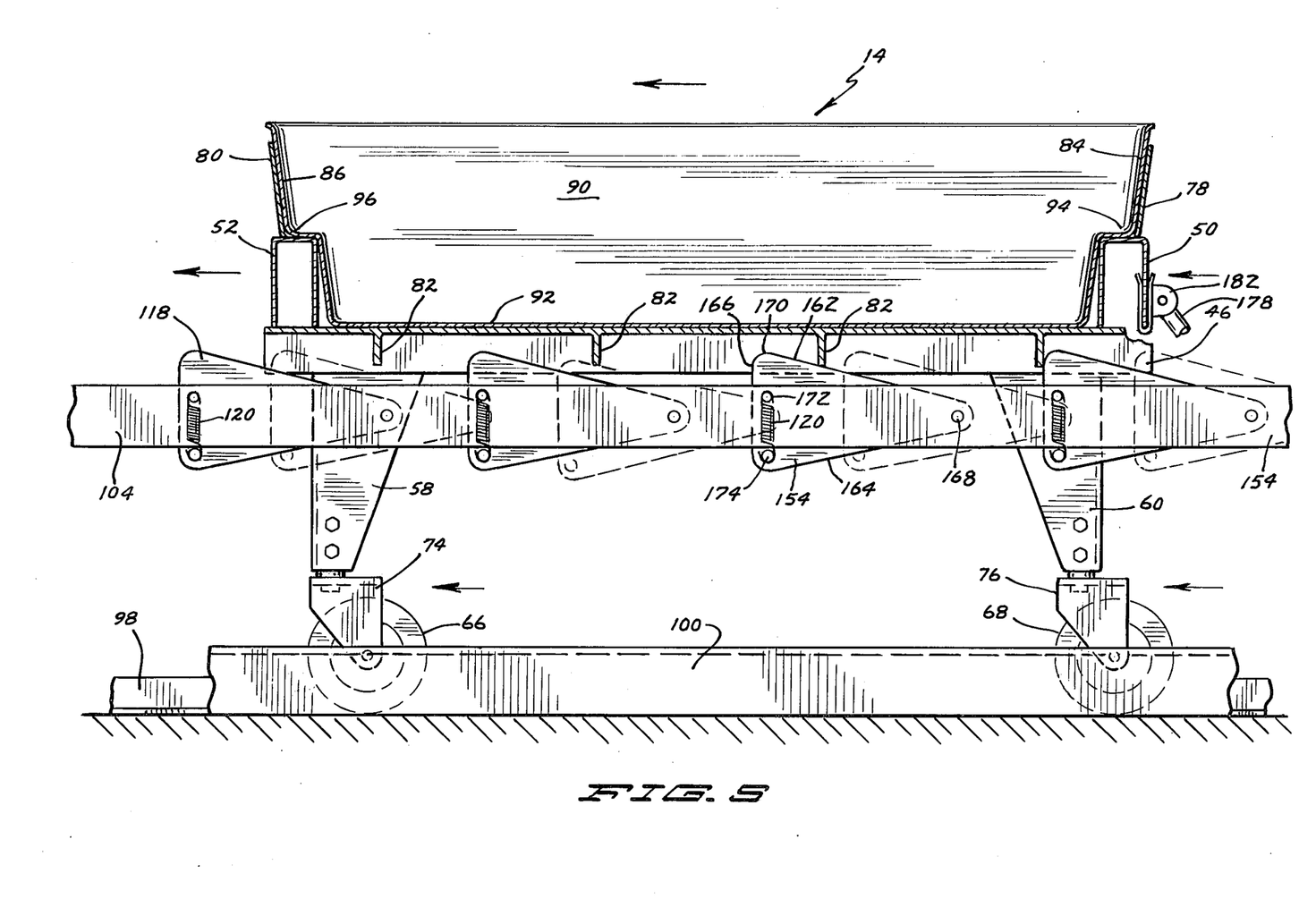
FIG. 5 is an enlarged view in partial section taken along line 5—5 of FIG. 2, or along line 5—5 of FIG. 4.

As shown more fully in FIG. 5, the support members 50 and 52 are secured to the top surface of the channel members 46 and 48, so that they are normal to such members. As such, they effectively connect the channel members 46 and 48 together. A pair of flanges 78 and 80 are secured to the top surface of the members 50 and 52 respectively. A plurality of spaced-apart pusher plates 82 are mounted within the channel members 46 and 48, so that they extend laterally with respect to the longitudinal axis of the channel members.

The trays 14 include a pair of side walls 84 and 86, a pair of end walls 88 and 90 and a bottom surface 92. As such, they are capable of holding a fluid medium, a growing medium such as soil, a plurality of plant holding pots, or the like. The size of the trays is optional; we have used trays having a length of 6 feet and a width of 3 feet. Trays of this size will hold a large number of plants. As shown in FIG. 5, the side walls 84 and 86 are provided with shoulders 94 and 96 respectively. The tray is supported on the cart 12 so that the shoulders 94 and 96 rest on the support members 50 and 52, and the bottom surface 92 rests on the channel members 46 and 48. If desired, additional cross members which extend parallel to the channel members 46 and 48 might be included for support purposes.

Reference will now be made to the apparatus for pushing or propelling the carts 12 through the chamber 16. A pair of parallel rails 98 are secured to the floor of the chamber 16 so that they extend longitudinally within the chamber. The rails 98 are spaced apart a slightly smaller distance than the spacing between the wheels 62 and 68, see FIG. 2. Thus, the rails guide the carts 12 through the chamber 16, as they are pushed therethrough.

The pusher apparatus 10 is comprised of a frame construction which includes a pair of parallel frame members 100 and 102 which are secured to the floor of the chamber by appropriate means (not shown), and a pair of parallel pusher bars 104 and 106 pivotally attached to the frame members 100 and 102 respectively, by pairs of legs 108 and 110, and 112 and 114 respectively. The pusher bars 104 and 106 are oriented with respect to the frame members 100 and 102, so that they are superposed and aligned with respect to such frame members. Preferably, the frame members and the pusher bars are approximately the same length. Each pusher bar is formed of a pair of spaced-apart girders 154 and 156. Cross members 116 and tie bars 117 are included to provide support and rigidity.

A plurality of triangularly-shaped spring-loaded lugs 118 are pivotally secured to each of the pusher bars, so that they are axially aligned therealong. As can be seen more explicitly in FIGS. 5 and 6, the lugs 118 include a pair of side walls 158 and 160, a pair of tapered edges 162 and 164, and a forward edge 166. A pin 168 pivotally connects each lug to one of the pusher bars so that it is interposed between the girders 154 and 156 and pivotable about an axis normal to the longitudinal axis of the pusher bars. The lugs 118 project upwardly so that a corner 170 of each lug projects above the top surface of the pusher bar; as such, they are adapted to engage the pusher plates 82 within the channel members 46 and 48. Springs 120 are provided for urging the lugs 118 in an upward direction. One end of each spring 120 is attached to a pin 172 which projects from the pusher bar, while its other end is attached to a pin 174 which projects from the side surface of each lug. The lugs can be readily pushed downwardly against the biasing action of the springs. The pins 174 limit the upward movement of the lugs by abutting against the bottom edge of the girders 154 and 156.

The pusher bars 104 and 106 are caused to move relative to the frame members 100 and 102 by means of a drive system which includes a pair of eccentrics or offsets 122 and 124 mounted on the ends of a drive shaft 126. The drive shaft 126 is rotatably mounted on the frame members 100 and 102, by means of pillow blocks 128 and 130. A sprocket 132 is fixedly connected to the drive shaft 126. A pair of connecting arms 134 and 136 operatively connect the eccentrics 122 and 124 respectively, to the foremost legs 110 and 112. One or more tie rods 138 are provided for connecting the arms 134 and 136 together. It must be realized of course, that if preferred, only a single connecting arm and eccentric could be provided; however, we have found that the use of two such mechanisms provide for a better balanced system.

Figure 3:
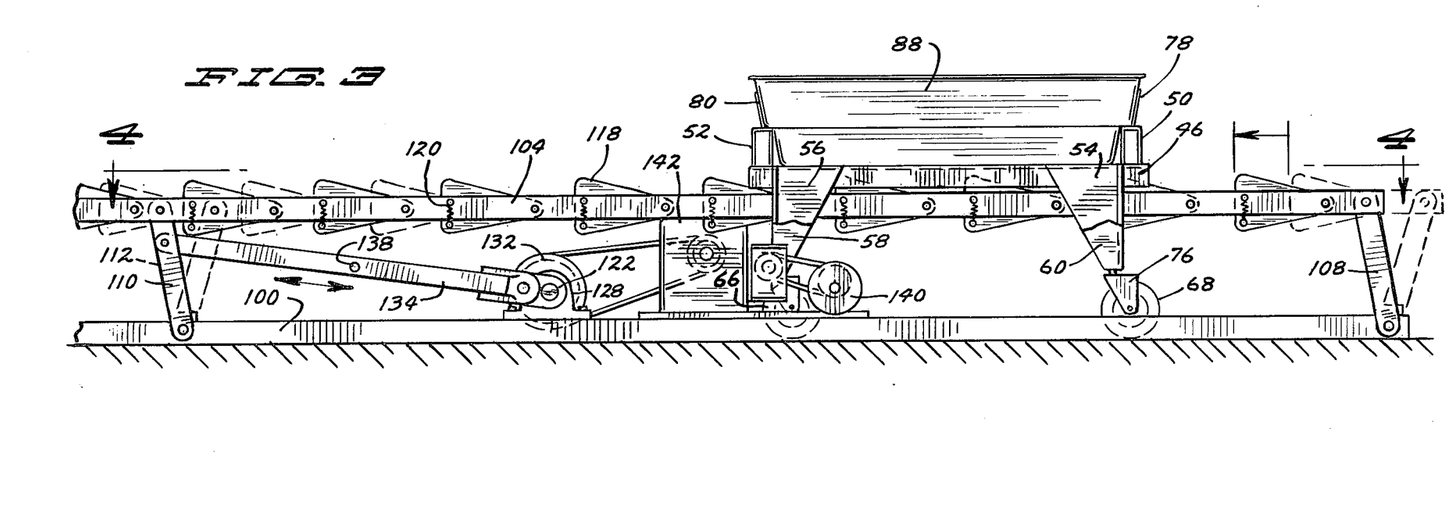
FIG. 3 is a side view with parts broken away, taken along line 3—3 of FIG. 2, which illustrates the cart pusher apparatus in greater detail.
Figure 4:
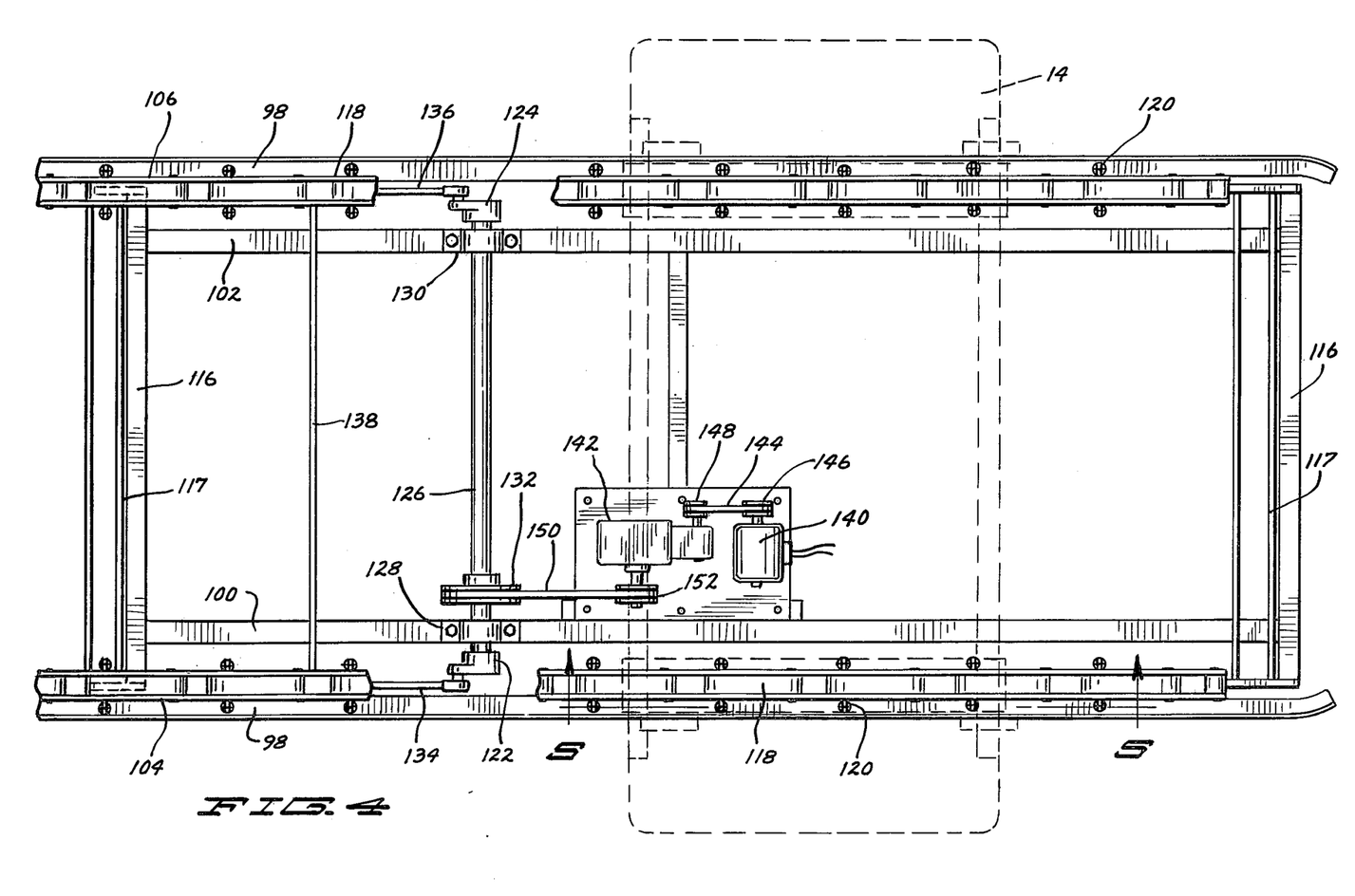
FIG. 4 is a plan view taken along line 4—4 of FIG. 3, with the cart and tray removed.
Figure 6:
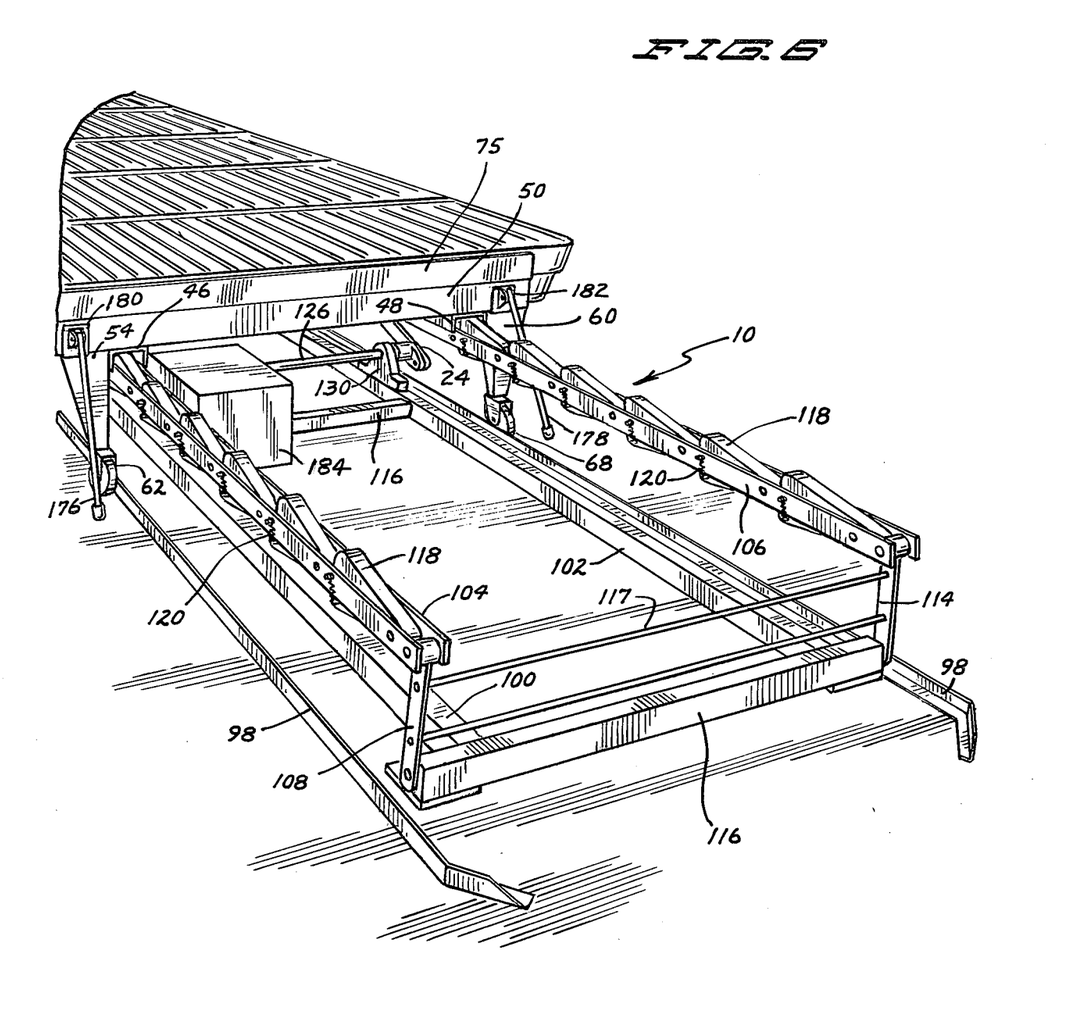
FIG. 6 is a partial perspective view illustrating the invention.

A motor 140 is provided for driving the shaft 126, and causing the pusher bars 104 and 106 to move or oscillate relative to the frame members 100 and 102, note particularly FIGS. 2-4. The output shaft of the motor is connected to the input portion of a gear reducer 142, by means of a drive chain 144 and sprockets 146 and 148. The output shaft of the gear reducer 142, is operatively connected to the sprocket 132 mounted on the drive shaft 126, by means of a drive chain 150 and sprocket 152. Gear reducers are well known and commercially available, hence, the reducer 142 will not be described in detail. In FIG. 6, a casing or cover 184 is shown as enclosing the motor 140 and associated components.

In operation, the carts 12 are introduced into the chamber 16 so that they straddle the rails 98, as well as the pusher apparatus 10. The carts 12 are aligned relative to the pusher bars 104 and 106 so that one of the lugs 118 on each bar, and more specifically, the forward edge 166 of the lug, engages one of the spaced-apart pusher plates 82 positioned within the channel members 46 and 48 of a cart stationed above the pusher bars 104 and 106. Since the lugs 118 are spring loaded so that they are urged in an upward direction; they can readily be depressed by pushing downwardly on them. In this manner, the carts 12 can easily be moved toward the left, as viewed in FIGS. 1 and 3, if no other carts are present. Since the lugs 118 move upwardly once the depressing force has been removed, they will engage the pusher plates 82, and movement of the cart in the opposite direction is effectively prevented.

As the motor 140 is energized, the shaft 126 is caused to rotate at a prescribed rpm. As the eccentrics 122 and 124 are caused to rotate about the axis of shaft 126, the connecting arms 134 and 136 exert a pushing or pulling force against the legs 110 and 112. As the legs 110 and 112 pivot about their connections to the frame members 100 and 102 respectively, the pusher bars 104 and 106 are caused to oscillate relative to the frame members 100 and 102, in a first or forward direction and a second or rearward direction.

The pusher apparatus 10 and carts 12 have been designed and constructed so that the distance between the pivot points of the lugs 118 is greater than the distance between the pusher plates 82 in the channel members 46 and 48. For purposes of illustration, the apparatus has been designed so that the distance between the pivot points of the lugs is 12 inches, whereas the distance between the pusher plates is 9 inches. On each forward stroke of the eccentrics, the carts will be moved forward 3 inches by the pusher bars, and more specifically by one set of the lugs 118. As the pusher bars move in the second or rearward direction, i.e., on the return stroke of the eccentrics 122 and 124, the spring loaded lugs 118 will slide beneath the pusher plates 82. When the eccentrics reach the end of their back stroke, a different set of lugs 118 will engage a different set of the pusher plates 82, and the eccentrics again drive the pusher bars in a forward direction, thus pushing the carts forward another 3 inches. FIG. 5 illustrates the forward position of the pusher bars and lugs 118 in solid lines, while the dotted lines depict the lugs on the back stroke of the eccentrics.

As the pusher apparatus 10 engages the bottom of one of the carts 12, a pushing force is exerted against that cart. As that cart is pushed forward, it in turn exerts a pushing force against all the aligned carts ahead of it. As seen in FIG. 1, the carts are aligned within the chamber 16 so that the support member 52 of each cart, abuts against the support member 50 of an adjacent cart. In this manner, the carts 12 are intermittently pushed through the chamber 16 from its inlet end, to its discharge end. In other words, on each forward stroke of the eccentrics, all the carts are pushed forward a prescribed distance. As one cart is removed from the discharge end, a new cart can be added to the inlet end.

Since the number of carts 12 aligned within the chamber 16 might be quite numerous, a relatively large driving force is required to push them. We have found that quite often, on the backward stroke of the eccentrics, the carts tend to move backwards a slight distance. This may be due to the frictional contact between the edge 162 of the lugs and the pusher plates 82. In any event, such backward movement of the carts, if large enough, will interfere with the operation of the apparatus because the lugs 118 will not properly engage the pusher plates 82. Accordingly, a pair of rods 176 and 178 are pivotally attached to the support member 50 of the last cart 12, so that their free ends drag on the floor of the chamber. The rods 176 and 178 are attached to clasp members 180 and 182 respectively, which can be removably attached to the support member 50 of the last cart in the aligned array of carts. These rods effectively brake the carts, and prevent any backlash from occurring. It should be realized that other apparatus might be effectively used for preventing such backward movement, as well.

The pusher apparatus 10 will push the carts 12 through the chamber at a rate of speed which is dependent upon the output speed of the motor 140. In one application in which the invention was used, a relatively slow forward speed of the carts was desired, i.e., 6 feet per day. By spacing the pivot points of the lugs 12 inches apart and the pusher plates 9 inches apart as indicated above, and by rotating the eccentrics one revolution per hour, the carts were moved forward three inches per hour, or a total of 6 feet within a 24 hour period. It must be realized of course, that the relative forward speed can readily be increased or decreased, for example, by changing the output speed of the motor 140, or the intermediate gear reduction.

For purposes of illustration, a typical example of transporting growing plants through the growth chamber 16 will be briefly described. As indicated above, the chamber 16 is divided into alternate periods of light and darkness, the duration of each being controlled by the relative spacing between the flaps 30. Each 24 hour period should encompass a day period and a night period. The number of 24 hour periods in a given growth chamber can vary, depending upon the length of the chamber, the number of compartments A and B, the desired growing period of the plants, and the like.

Alternate periods of 18 hours of daylight and 6 hours of nighttime have been used in growing certain vegetables. A plurality of small potted plants were positioned in a plurality of 3 ft. × 6 ft. trays 14, after which the trays were mounted on the carts 12 and introduced into the inlet end of the chamber 16, so that the 6 foot dimension of the trays was normal to the direction of tray movement, i.e., the longitudinal axis of the chamber. Two trays were introduced daily, and two trays were removed daily.

The environmental conditions within the growth chamber 16 can readily be controlled, to best suit the requirements of the specific plants. Since these factors form no part of the present invention, no further disclosure will be made, other than to state that the temperature between the daylight and nighttime compartments will normally vary by several degrees. The lamps 38 can be used for heating the compartments A. The compartments B on the other hand, may require means for cooling them so as to attain a desired temperature during the nighttime hours. As the plants are transported through the chamber 16, they can be periodically sprinkled with a fluid medium, by means of the sprinkling system which includes the nozzles 44. While the plants are within the chamber 16, they continue to grow daily, the exact amount of growth depending upon how long they are in the chamber, the amount of nutrients supplied, as well as the specific environmental conditions therein.

In the above description and attached drawings, a disclosure of the principles of the invention is presented together with some of the specific embodiments by which the invention might be carried out.

The embodiments of this invention in which an exclusive property or privilege is claimed are defined as follows:

1. Apparatus for moving a plurality of aligned carts along a predetermined path comprising a frame construction which includes a pair of parallel elongated frame members, each cart including a frame structure adapted to straddle said frame construction, a pair of parallel elongated pusher bars, means for orienting said bars with respect to said frame members so that they are superposed and aligned therewith, said means including two pairs of substantially vertically oriented legs, means for pivotally connecting one end of each pair of legs to a frame member, means for pivotally connecting the other end of each leg to a pusher bar so that each pusher bar is connected to a frame member by a pair of said legs, means for oscillating said pusher bars with respect to said frame members along a path parallel to said bars and frame members, means mounted on said pusher bars for engaging a portion of at least one cart and causing it to move as the pusher bars move in a first direction, said engaging means comprising a plurality of lugs, means for mounting said lugs on the pusher bars so that they are axially aligned along the longitudinal axis of said bars in spaced-apart relationship, means for biasing said lugs in an upward direction so that a portion of each lug projects above the top surface of the pusher bar, said lugs being movable against such biasing action by exerting a downward force against said lugs, means on each cart frame adapted to be engaged by said lugs, said means including a pair of elongated parallel channel members, means for attaching said channel members to the cart frame so that they are aligned directly over said pusher bars and parallel therewith, a plurality of pusher plates, means for mounting said plates within the channel members in spaced-apart relationship so that they extend laterally with respect to the longitudinal axis of the channel members, said lugs adapted to engage said pusher plates as the pusher bars are caused to move in said first direction, said frame members and said pusher bars being shorter in length than the alignment of carts so that the means mounted on the pusher bars engage less than all the aligned carts, said cart when moved causing the other aligned carts ahead of it to move as well, said engaging means permitting said cart to remain substantially stationary as the pusher bars move in a second direction, and means for guiding said carts along said predetermined path.

2. The combination of claim 1 wherein each pusher bar is formed by a pair of spaced apart girders, said lugs being interposed between said girders and pivotable about an axis normal to the longitudinal axis of the pusher bar.

3. The combination of claim 1 wherein means are provided for pivotally connecting each lug to a pusher bar, each lug including an inclined edge which permits the pusher plates to pass over it as the cart is moved in a second direction.

4. The combination of claim 2 in which the relative distance between the lugs is greater than the distance between the pusher plates whereby one set of lugs will always engage one set of pusher plates on a specific cart stationed above it as the pusher bars move in said first direction.

5. The combination of claim 1 wherein the means for guiding the carts includes a pair of parallel rails, means for positioning said frame construction between said rails.

6. The combination of claim 1 in which the means for oscillating the pusher bar includes at least one eccentric, a rotatable shaft, means for mounting said eccentric on said shaft for rotation about the shaft axis, a connecting arm for operatively connecting said eccentric to at least one of the legs, and means for causing said shaft to rotate at a prescribed speed.

7. The combination of claim 1 wherein the cart includes a front portion and a rear portion, at least one elongated rod is pivotally connected at one of its ends to the rear portion, the free end of said rod adapted to drag on the mounting surface for the frame construction as the pusher bars move in said first direction, said rod effectively braking the cart and preventing it from moving in the second direction, as the pusher bar moves in said second direction.

8. The combination of claim 1 which includes a plurality of trays, means for removably positioning one of said trays in each of said carts.

* * * * *

UNITED STATES PATENT AND TRADEMARK OFFICE
CERTIFICATE OF CORRECTION

PATENT NO. : 4,075,949
DATED : February 28, 1978
INVENTOR(S) : Noel Davis, John T. Haub, Stanley C. Rustad It is certified that error appears in the above-identified patent and that said Letters Patent are hereby corrected as shown below:

Col. 7, line 11; please change "claim 2" to ---claim 1---.

Signed and Sealed this

Twenty-seventh Day of June 1978

[SEAL]

Attest:

RUTH C. MASON
Attesting Officer

DONALD W. BANNER
Commissioner of Patents and Trademarks